United States Patent [19]

Gerace et al.

[11] 4,440,829
[45] Apr. 3, 1984

[54] COATED BONDING TAPES HAVING IMPROVED PEEL STRENGTH COMBINED WITH LOW TEMPERATURE FLEXIBILITY

[75] Inventors: Michael J. Gerace, Centerville; Jeffry D. Adams, Vandalia, both of Ohio

[73] Assignee: Protective Treatments, Inc., Dayton, Ohio

[21] Appl. No.: 393,374

[22] Filed: Jun. 29, 1982

[51] Int. Cl.$^3$ ............................ C09J 7/02; B60R 13/00
[52] U.S. Cl. ........................................ 428/343; 428/31; 428/323; 428/331; 428/492; 428/519; 428/913
[58] Field of Search ............... 428/7, 31, 343, 913, 428/492, 519, 331, 323

[56] References Cited

U.S. PATENT DOCUMENTS 3,896,245 7/1975 Seto et al. ............................. 428/7
4,061,805 12/1977 Thompson et al. ................... 428/31

Primary Examiner—Thomas J. Herbert, Jr.
Attorney, Agent, or Firm—Dressler, Goldsmith, Shore, Sutker & Milnamow, Ltd.

[57] ABSTRACT

A coated bonding tape having improved peel strength combined with low temperature flexibility is disclosed in which a layer of impact-resistant material constituted by a milled layer of pigmented and plasticized elastomer is coated with a pressure-sensitive adhesive coating and in which the elastomer layer consists essentially of butyl rubbers, pigment and sufficient plasticizer for the elastomer to provide a half thickness reduction at a pressure below 800 psi. At least about 45% of the butyl rubber is cross-linked, at least about 20% of the butyl rubber is noncross-linked and has an average molecular weight of at least about 250,000, and at least about 60% of the pigment is of reinforcing character, the proportion of plasticizer providing a tape body having a strength of at least about 30 psi before plastic flow begins, and the pressure-sensitive adhesive coating is selected to provide a bond to the tape body which is strong enough to force the bonding tape to fail cohesively when peeled from a substrate.

15 Claims, No Drawings

COATED BONDING TAPES HAVING IMPROVED PEEL STRENGTH COMBINED WITH LOW TEMPERATURE FLEXIBILITY

DESCRIPTION

1. Technical Field

This invention relates to bonding tapes in which an energy-absorbing tape body is combined with a pressure-sensitive coating therefor.

2. Background Art

Bonding tapes in which an energy-absorbing tape body is coated with a pressure-sensitive coating are known and in commercial use for supporting trim strips, particularly on automobile bodies. These bonding tapes exhibit a markedly improved ability to resist separation from a supporting substrate when impacted. It is desired to increase the peel strength possessed by these bonding tapes, but difficulty has been encountered.

More particularly, energy-absorbing bonding tapes are disclosed in commonly owned U.S. Pat. Nos. 3,896,245 and 4,061,805. In these patents, the tape body is formed by extruding an intimately milled mixture of elastomer, plasticizer for the elastomer, and pigments in order that a tape which is soft enough to be easily processed, extruded and permanently deformed under relatively high pressure will resist cold flow at low pressure. These tapes absorb energy, so when impacted the pressure-sensitive coating can hold the tape in place on a supporting substrate while the energy of impact is absorbed because it is distributed throughout the body of the tape.

At the usual tape strength in the prior art, the coated tapes referred to above fail cohesively in that the body of the tape is disrupted when pressure-sensitive adhesives which bond strongly to the tape body and the supporting substrate are selected to maximize the peel strength. On the other hand, the inclusion of larger amounts of resin or elastomer in the tape body and the selection of pigments which confer strength allow one to increase the strength of the tape body. However, when this is attempted, and particularly at low temperature, the tapes lose flexibility and fail by delamination in that the tape body separates from the pressure-sensitive coating.

Accordingly, and when one attempts to provide bonding tapes which allow the mounting of trim strips which more strongly resist removal when impacted, one is caught on the horns of a dilemma, especially when low temperature impact resistance is also desired. First, the stronger tapes tend to be stiffer, particularly at low temperature, and fail by delamination so that the strength in the tape body is never realized. Second, the stronger tapes resist milling and extrusion and are harder to install. In one way or another, the coated bonding tapes now in use are as strong as possible, but it is desired to make them significantly stronger without losing the capacity to mill and extrude the compositions and while retaining the flexibility at low temperature to prevent delamination.

DISCLOSURE OF INVENTION

In this invention, a coated bonding tape is provided with improved peel strength combined with low temperature flexibility by modifying the normal combination of a base layer constituted by an impact-resistant milled mixture of pigmented and plasticized butyl rubber coated with a pressure-sensitive adhesive coating. We change the base layer to make it of a milled mixture of butyl elastomers, pigment and plasticizer for the elastomers in which at least about 45% of the butyl rubber mixture is cross-linked, at least about 20% of the butyl rubber mixture is noncross-linked with an average molecular weight above about 250,000, and at least about 60% up to 100% of the pigment is selected to have reinforcing character.

All proportions herein and in the accompanying claims are by weight unless otherwise specified.

The proportion of plasticizer is minimized to provide a tape body having a tensile strength of at least about 30 psi before plastic flow begins. Existing tape bodies have a tensile strength which does not exceed about 25 psi before plastic flow begins becuase, when their strength is increased, the coated tapes fail by delamination, especially at low temperature. The bonding tapes under consideration are normally used in exterior service where low temperatures are expected.

While the proportion of plasticizer cannot be too high without unduly reducing the strength of the tape body, one must still employ enough plasticizer (either internal of the butyl rubber or external thereto) to provide a half thickness reduction at a pressure below about 800 psi, preferably below about 700 psi. This is necessary in order that the mixture will be millable and extrudable and soft enough to conform with variations in the surface of the substrate to which it is bonded.

After the tape body has been appropriately formulated, as indicated above, then one must select a pressure sensitive adhesive coating to provide a strong enough bond to the tape body to cause the bonding tape to fail cohesively when it is peeled from a substrate. This aspect of the invention is itself conventional and several commercially available pressure-sensitive adhesives have been found to be effective, including those currently used in coated bonding tapes in commerce. Thus, the selection of the pressure-sensitive adhesive in this invention represents normal practice, but it is an aspect of this invention from the standpoint that the adhesive must be effective enough to allow one to utilize the advantages which are present in the new tape bodies which are provided herein and which combine increased strength with low temperature flexibility.

As previously indicated, the combination of increased strength and low temperature flexibility requires employing a butyl rubber mixture containing a larger than usual proportion of cross-linked butyl rubber in combination with a pigment mixture containing an increased proportion of pigment of reinforcing character.

The elastomer must consist essentially of butyl rubbers some of which are cross-linked and some of which are not cross-linked. This is because these butyl rubbers provide superior impact resistance. At least about 20%, preferably at least about 30%, of the elastomer should be noncross-linked butyl rubber having an average molecular weight above about 250,000, preferably above about 300,000. However, when the noncross-linked butyl rubbers constitute too large a proportion of the elastomer, then the somewhat inconsistent properties desired herein have not been attainable.

A large proportion of the elastomer, at least about 45% thereof, preferably at least about 50% thereof, should be a cross-linked butyl rubber. This is because the cross-linked butyl rubber contributes greater strength with lesser reduction in low temperature flexibility. The cross-linked butyl rubber is simply a standard butyl which is cross-linked, as by the presence in the mixture which is polymerized of 0.5% to 3.0% of divinyl benzene or other polyethylenically unsaturated monomer, to provide a solubility in cyclohexane of about 10% to about 50%, preferably about 10% to about 25%.

It is also preferred to select plasticizers which have the greatest affinity for the butyl rubber elastomer component, namely, the plasticizer should consist essentially of liquid polybutenes. These are desirably used in admixture and may range in viscosity from about 100 centistokes to about 4000 centistokes. It has been found that when other plasticizers are eliminated or minimized (less than 20% of the total), that the plasticizer provides adequate processing to permit milling and extrusion of the stronger mixtures used herein, albeit somewhat higher extrusion pressures are needed. The polybutenes also serve as tackifiers which helps to provide superior low temperature adhesion. In this way the typical polybutene content of prior tapes (about 12-13%) is increased herein to about 15% to 25%, preferably 18% to 22%. The overall proportion of plasticizer (about 20% to 30%) is not markedly changed over prior practice.

In preferred practice, the proportion of elastomer is increased over prior normal practice. About 26.5% of the total milled mixture was previously constituted by elastomers of relative high molecular weight because more tended to introduce excessive stiffness. It is now found that preferred practice involves the use of from 28% to 33% of elastomer in the milled mixture. By using more butyl rubber, the product has greater flexibility and retains it better at low temperature. Of course, it is the increase in the proportion of cross-linked rubber which enables the use of a greater amount of total elastomer.

It is also desirable to use less total pigment (including filler). When one introduces particles into an elastomer mixture, one can achieve different results. First, one may simply load the mixture without markedly changing its strength. Such particles are termed fillers which add bulk and weight. These are illustrated by talc. In some instances the filler may stiffen the composition, such as asbestos, but this does not involve any significant change in the strength. Some particles, like carbon blacks (especially furnace blacks) have a great affinity for the elastomer and physically strengthen the mixture to produce bodies of greater strength. These are called reinforcing pigments, and are further illustrated by precipitated silicas.

In prior practice the total pigment content was about 48% to 49%, but by reducing or eliminating asbestos and talc and by increasing the proportion of reinforcing pigments, it is now preferred to have the pigment constitute about 38% to about 46% of the total tape body, preferably from 40% to 45%.

The altered pigment character and proportion used herein maximize strength while minimizing the loss of flexibility which normally accompanies the desired strength increase. In combination with the selection of an increased proportion of cross-linked butyl rubber, and especially when the plasticizer component consists essentially of liquid polybutenes, the tape bodies of this invention can possess higher strengths than were heretofor possible while retaining low temperature flexibility.

The strengths referred to hereinbefore are measured by pulling a specimen. When a tension is reached where plastic flow begins (the specimen strings out and stops resisting the tensile load), this is the strength used herein; and to maintain the numbers independent of the size of the specimen, the results are reported in pounds per square inch. A typical specimen is about ¼th inch square in cross-section. The preferred tape body strength in this invention is at least about 35 psi, and is preferably in the range of 35 psi to 45 psi.

It is desired to point out that auxiliary agents such as tackifiers, coupling agents for the fillers, antioxidants, and processing aids can be used but are not part of this invention. These are illustrated in the examples.

EXAMPLE

The following four components are mixed together for 5 minutes in a highly torqued, double arm mixer of the type which is in common use for the milling of rubber compositions.

(1) 35 Parts of polyisobutylene containing 0.8% of copolymerized isoprene having an average molecular weight of 350,000 and a Mooney viscosity of 46-55. The Exxon product, Butyl 268, may be used.

(2) 55 Parts of a terpolymer of isobutylene, 0.8% isoprene and a small amount of divinylbenzene to provide a crosslinked butyl rubber which is 20% soluble in cyclohexane at room temperature. Polysar Butyl XL-20, provided by Polysar, Limited, may be used.

(3) 10 Parts of a styrene-butadiene rubber block copolymer containing 30% styrene and 70% butadiene. The Shell Chemical Company product, Kraton 1101, may be used.

(4) 5 Parts of stearate processing aid. Stearic acid triglyceride or zinc stearate may be employed, or the commercial stearate soap-containing product, Structol EP-52, supplied by Structol Company of Stowe, Ohio, may be used.

After mixing the above, add the following and continue mixing for one-half hour.

(5) 25 Parts of an oil-containing carbon black. The product used contains fast-extruding furnace carbon black which has been sprayed with 70 parts of oil to 100 parts of the black to provide a dispersion having the capacity to absorb 130 cc of dibutyl phthalate per 100 grams of the composition. The commercial product, Statex MRG, provided by Cities Service Company, may be used.

(6) 15 Parts of fast-extruding furnace black. The Cities Service Company product, Statex F12 may be used.

(7) 10 Parts of terpene phenolic resin having a ring and ball softening point of 85°-105° C. The Reichhold product, Varcum 29-421, may be used. The terpene phenolic resin serves as a tackifier.

(8) 22.5 Parts of liquid polybutene having a molecular weight of about 2060. The Amoco product, H-1500, may be used.

After the above is mixed, the following additional ingredients are added to the mixture being milled and mixing is continued for one hour.

(9) 70 Parts of precipitated amorphous silica of small particle size (only 0.07% is retained on a 325 mesh screen). The silica used has the capacity to absorb 193 grams of dibutyl phthalate per 100 grams of silica. The commercial product, Hi-Sil 233, supplied by PPG Industries, may be used.

(10) 30 Parts of talc having a particle size such that the particle of medium size has a diameter of 1.5 millimicrons. The product used has the capacity to absorb 80 grams of dibutyl phthalate per 100 grams of talc. The commercial product, Mistron Vapor, provided by Cypress Industrial Minerals Company, may be used.

(11) 22.5 Parts of the product described previously as component 8.

(12) 25 Parts of liquid polybutene of molecular weight 420. The Amoco product, L-50, may be used.

The milled product is now complete, but it is preferred to add auxiliary components as indicated below, and these are mixed in for one-half hour.

(13) 2 Parts of phenolic antioxidant, tetrakis (methylene 3-[3',5'-di-tert-butyl-4'-hydroxyphenyl] propionate) methane, having a melting range of 110°–125° C.

(14) 5 parts of a liquid terpene resin tackifier. This material is a natural mixture of pinenes which are heat-bodied in the presence of catalysts to a viscous, slow-pouring liquid. The commercial product, Wingtack 10, may be used.

(15) 2 parts of an epoxy-functional trimethoxy silane. The compound used is gamma-glycidoxypropyl trimethoxy silane.

The milled mixture is then extruded through an orifice having a size of 0.045 inch by 0.5 inch at 200° F. at a rate producing 25 feet per minute of extruded tape. The extruded product directly from the extruder was passed through an organic solvent solution of pressure-sensitive adhesive. The preferred adhesives are acrylic solution copolymers which include small amounts of hydroxy-functional monomers in combination with maleic anhydride or N-methylol acrylamide to provide a self-curing copolymer which cures slowly over a long period of time at room temperature. These self-curing copolymer pressure-sensitive adhesives are known materials and are preferred herein because they provide a superior bond, though this is itself known.

Pressure-sensitive adhesives of the type under consideration are available in commerce from several sources. Thus, National Starch provides Duro-Tak resins such as Duro-Tak 80-1068 which will be used herein as illustrative. Also, Ashland Chemical Company sells Aroset resins, such as Aroset 1831, and Monsanto makes available a series of Gelva resins, such as Gelva 1753 and Gelva 2165 which are also useful herein.

Using the Duro-Tak 80-1068 as illustrative, it can be applied as a 15% solids solution in an equiweight mixture of toluene and ethyl acetate. Excess adhesive solution is wiped off the tape and the coated tape is dried in hot air and then placed on a release liner, ready for use. To facilitate storage, the product on the liner is wound into a flat coil in which the release liner and the tape thereon is at a right angle to the plane of the coil. In use, the desired length of product is removed from the coil, severed, and applied to the rear face of a trim strip. The liner is left in place until immediately before the trim strip is to be bonded where desired, normally to the side body of an automobile.

It is also desired to minimize cold flow under load, and this aspect of preferred compositions is enhanced by the presence in the elastomer mixture of a block copolymer of styrene and butadiene containing from 15% to 45% by weight of styrene, balance butadiene. The block copolymer is used in an amount of 3% to 20%, based on the total weight of butyl rubbers, and this aspect of preferred practice is illustrated in the Example presented previously.

What is claimed is:

1. A coated bonding tape having improved peel strength combined with low temperature flexibility comprising, a layer of impact-resistant material constituted by a milled layer of pigmented and plasticized elastomer coated with a pressure-sensitive adhesive coating, said elastomer layer having an elastomer component consisting essentially of a mixture of butyl rubbers, pigment and plasticizer for said elastomer sufficient to provide a half thickness reduction at a pressure below 800 psi, at least about 45% of said butyl rubber mixture being cross-linked, at least about 20% of said butyl rubber mixture being noncross-linked with an average molecular weight above about 250,000, and at least about 60% of said pigment having reinforcing character, the proportion of plasticizer providing a tape body having a tensile strength of at least about 30 psi before plastic flow begins, and said pressure-sensitive adhesive coating being selected to provide a bond to said tape body strong enough to force said bonding tape to fail cohesively when peeled from a substrate.

2. A coated bonding tape as recited in claim 1 in which the tape body's strength is at least about 35 psi.

3. A coated bonding tape as recited in claim 1 in which the tape body has a strength of from 35-45 psi.

4. A coated bonding tape as recited in claims 1 or 3 in which said reinforcing pigments are selected from carbon black and precipitated silica.

5. A coated bonding tape as recited in claim 1 in which from 28% to 33% of the tape body is elastomer, from 38% to 46% of the tape body is total pigment, and from 20% to 30% of the tape body is plasticizer for said elastomer component.

6. A trim strip having adhesively associated with the rear face thereof, the coated bonding tape recited in claim 1.

7. A coated bonding tape as recited in claim 1 in which the plasticizer content is sufficient to provide a half thickness reduction at a pressure below 700 psi.

8. A coated bonding tape as recited in claim 1 in which said pressure-sensitive adhesive coating is a self-curing acrylic solution copolymer which cures slowly over a long period of time at room temperature.

9. A coated bonding tape as recited in claim 1 in which from 3% to 20% of the total weight of butyl rubbers is constituted by a block copolymer of styrene and butadiene, said block copolymer containing from 15% to 45% by weight of styrene, balance butadiene.

10. A coated bonding tape as recited in claim 1 in which at least about 30% of said butyl rubber is non-cross-linked butyl rubber having an average molecular weight above about 300,000.

11. A coated bonding tape as recited in claim 10 in which said molecular weight is above about 300,000.

12. A coated bonding tape as recited in claim 1 in which said cross-linked butyl rubber has a solubility in cyclohexane of about 10% to about 50%.

13. A coated bonding tape as recited in claim 12 in which said solubility is from about 10% to about 25%.

14. A coated bonding tape as recited in claims 1, 3, 11 or 12 in which said plasticizer consists essentially of liquid polybutenes.

15. A coated bonding tape as recited in claim 14 in which said liquid polybutenes have a viscosity in the range of from about 100 to about 4000 centistokes.

* * * * *